Figure 1:
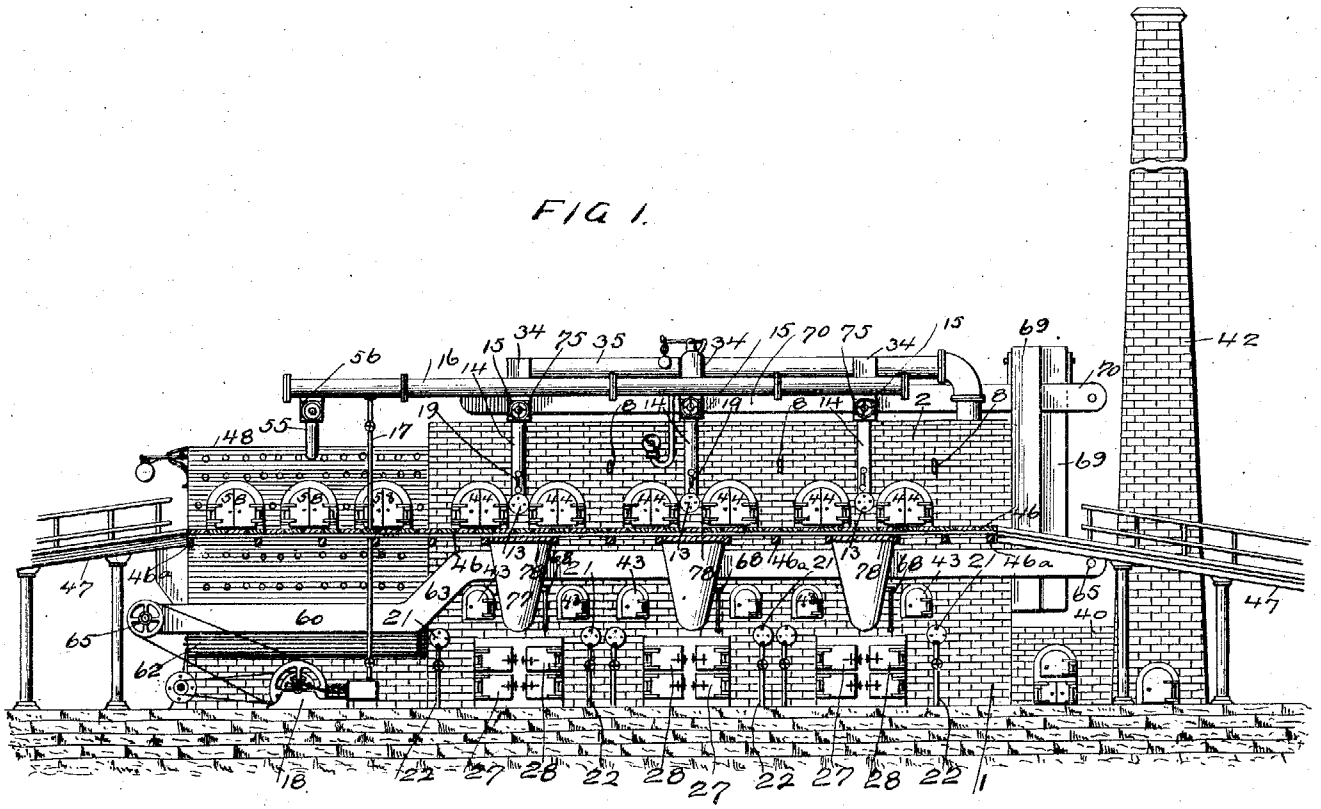

No. 12,059. Reissued Nov. 25, 1902.

F. L. DECARIE.

CREMATORY.

Application filed Aug. 25, 1902.

7 Sheets—Sheet 1.

WITNESSES

E. G. Strange

P. G. Hanson.

INVENTOR

FELIX L. DECARIE

BY Pauer & Paul

HIS ATTORNEYS

No. 12,059. Reissued Nov. 25, 1902.

F. L. DECARIE.

CREMATORY.

Application filed Aug. 25, 1902.

7 Sheets—Sheet 2.

WITNESSES

E. G. Strauss

C. G. Hanson

INVENTOR

FELIX L. DECARIE

BY Paul & Paul

HIS ATTORNEYS

No. 12,059. Reissued Nov. 25, 1902.

F. L. DECARIE.

CREMATORY.

(Application filed Aug. 25, 1902.)

7 Sheets—Sheet 3.

WITNESSES
E. G. Strauss
O. G. Hanson

INVENTOR
FELIX L. DECARIE
BY Paul & Paul
HIS ATTORNEYS

No. 12,059. Reissued Nov. 25, 1902.

F. L. DECARIE.

CREMATORY.

Application filed Aug. 25, 1902.

7 Sheets—Sheet 4.

WITNESSES
E. G. Grande
O. G. Hanson

INVENTOR
FELIX L. DECARIE
BY Paul & Paul
HIS ATTORNEYS

No. 12,059. Reissued Nov. 25, 1902.

F. L. DECARIE.

CREMATORY.

(Application filed Aug. 25, 1902.)

7 Sheets—Sheet 5.

WITNESSES
E. G. Strode
R. G. Hanson

INVENTOR
FELIX L. DECARIE
BY Pennie & Pennie
HIS ATTORNEYS

No 12,059.
Reissued Nov. 25, 1902.
F. L. DECARIE.
CREMATORY.
Application filed Aug. 25, 1902.
7 Sheets—Sheet 6.
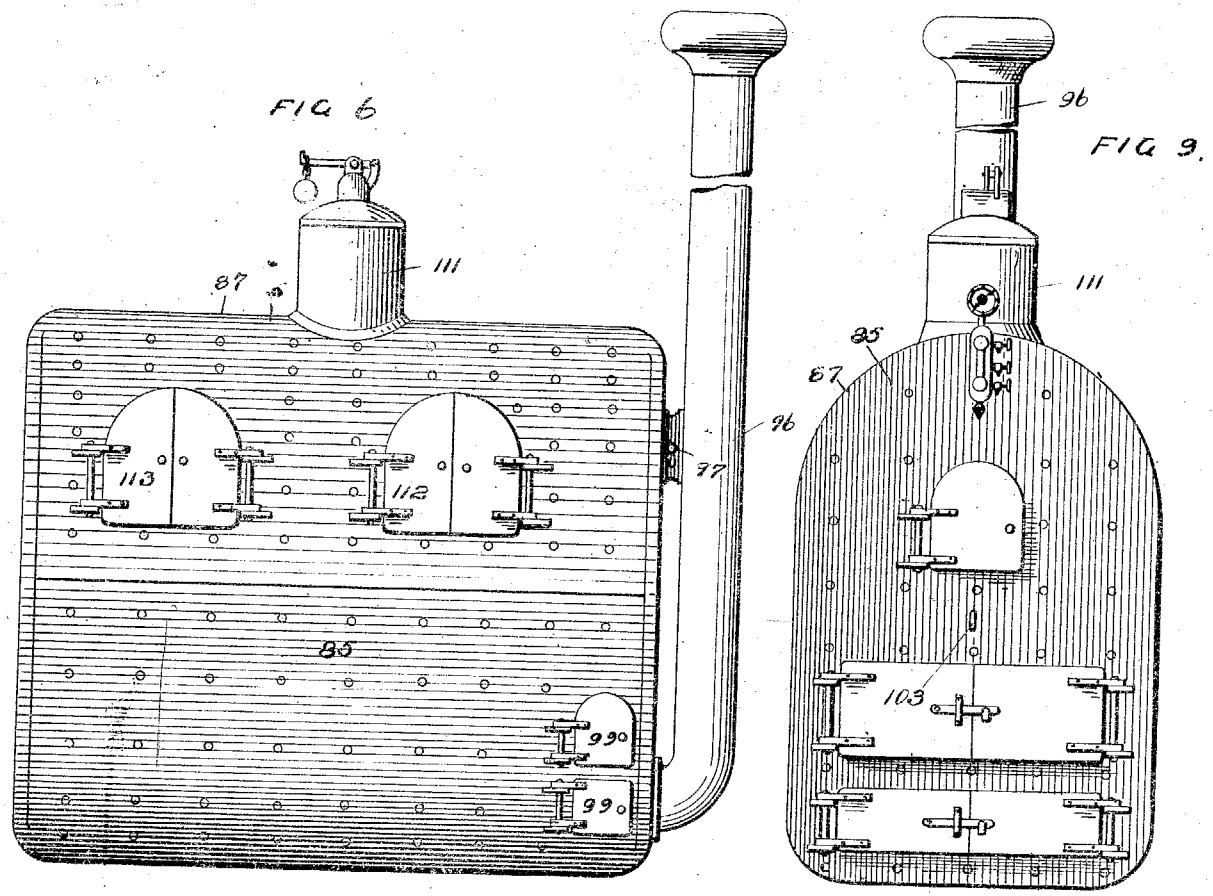
WITNESSES
C. G. Stance
C. U. Hanson
INVENTOR
FELIX L. DECARIE
BY Paul & Paul
HIS ATTORNEYS No. 12,059. Reissued Nov. 25, 1902.
F. L. DECARIE.
CREMATORY.
(Application filed Aug. 25, 1902.)
7 Sheets—Sheet 7.
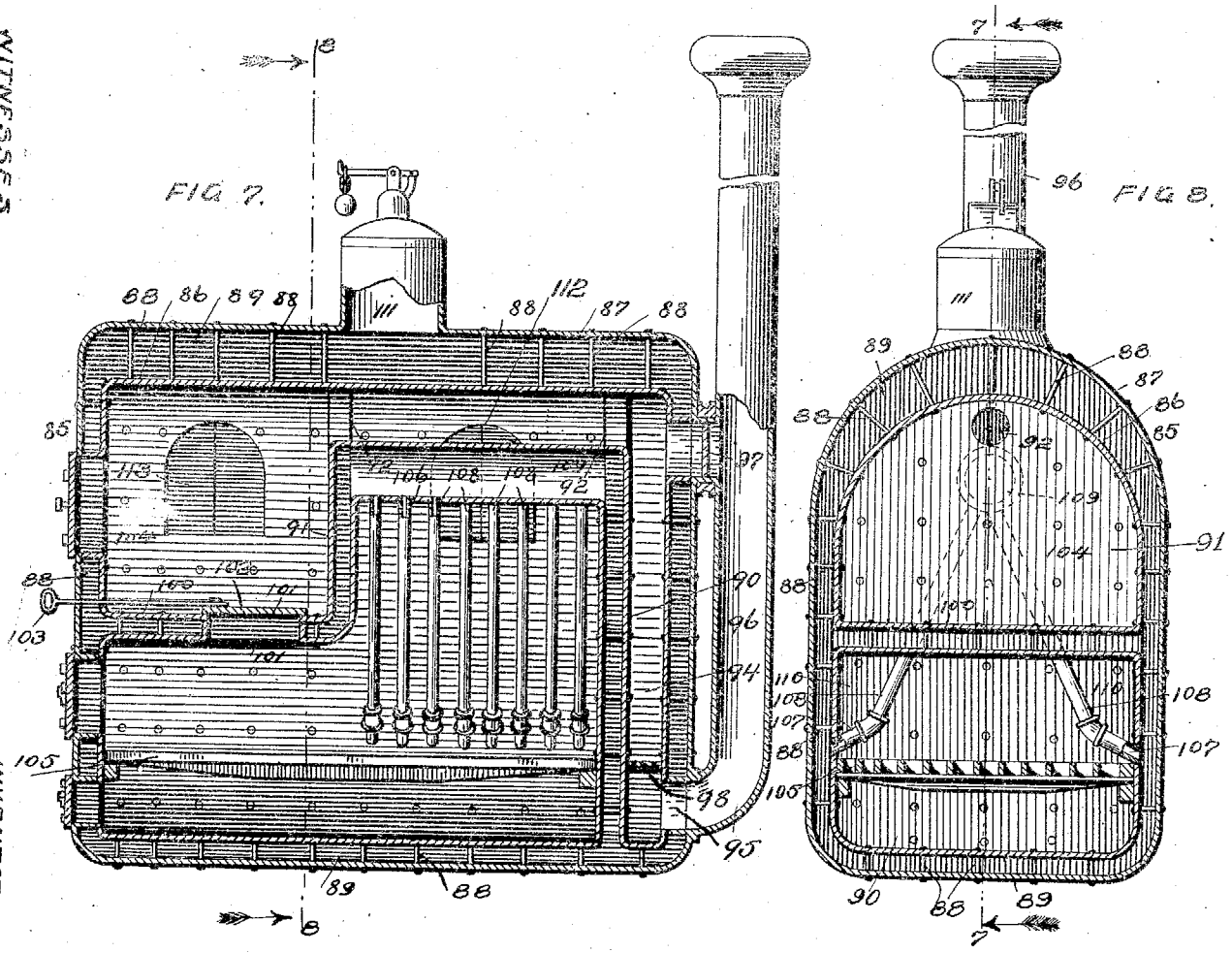
WITNESSES.
C. G. Stone
Q. G. Hanson
INVENTOR
FELIX L. DECARIE
BY Paul & Paul
HIS ATTORNEYS

UNITED STATES PATENT OFFICE.

FELIX LOUIS DECARIE, OF MINNEAPOLIS, MINNESOTA, ASSIGNOR TO THE DECARIE MANUFACTURING COMPANY.

CREMATORY.

SPECIFICATION forming part of Reissued Letters Patent No. 12,059, dated November 25, 1902.

Original No. 596,421, dated December 28, 1897. Application for reissue filed August 25, 1902. Serial No. 121,019.

*To all whom it may concern:*

Be it known that I, FELIX LOUIS DECARIE, a subject of the King of Great Britain, residing at Minneapolis, in the county of Hennepin, State of Minnesota, have invented a new and useful Crematory, of which the following is a specification.

This invention relates to crematories, and more particularly to that class designed for burning the garbage and refuse of cities and towns.

To this end the main and primary object of the present invention is to construct a garbage or refuse crematory on a plan that will insure a thorough consumption of the matter on an economical basis in the matter of fuel, as the invention contemplates means for utilizing certain portions of the garbage or refuse when in the proper condition as the fuel for supporting the main consuming fire of the apparatus.

The invention, furthermore, provides a construction of crematory with the parts thereof so arranged as to insure a proper separation of the matter being burned, and also for utilizing the heat created within the crematory for the purpose of generating steam for power purposes.

With these and other objects in view, which will readily appear as the nature of the invention is better understood, the same consists in the novel construction, combination, and arrangement of parts hereinafter more fully described, illustrated, and claimed.

Figure 2:
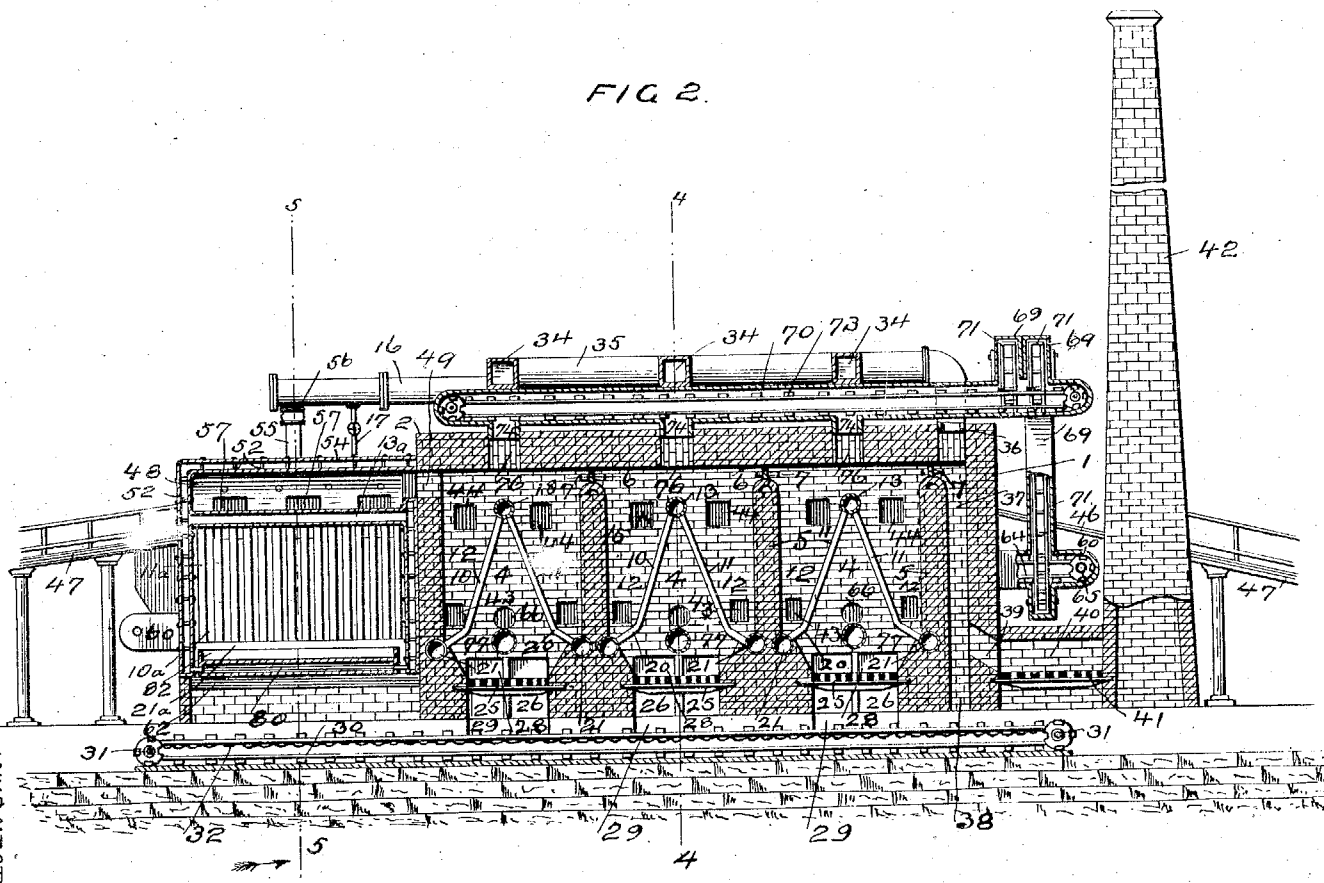
Figure 3:
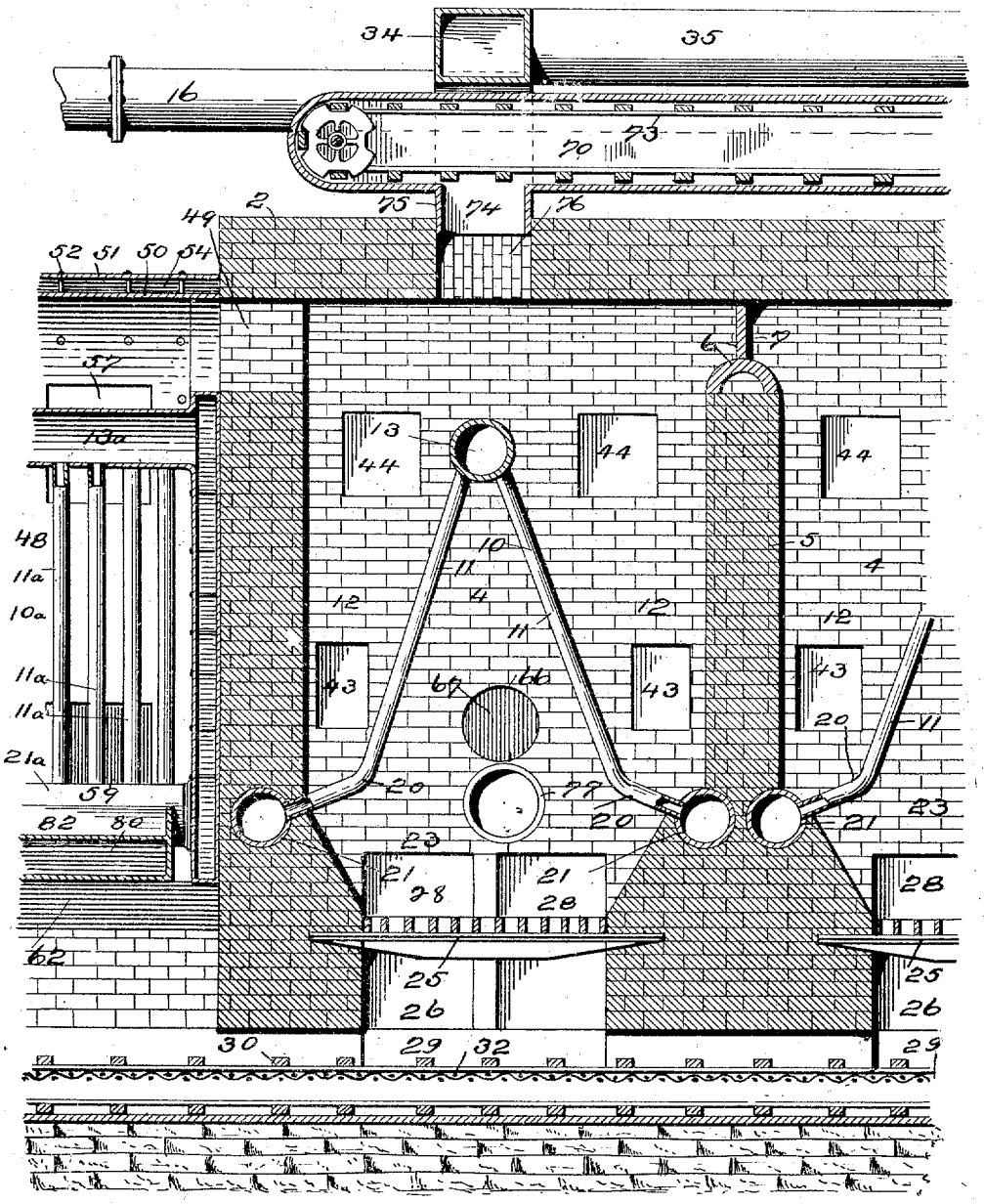
Figure 4:
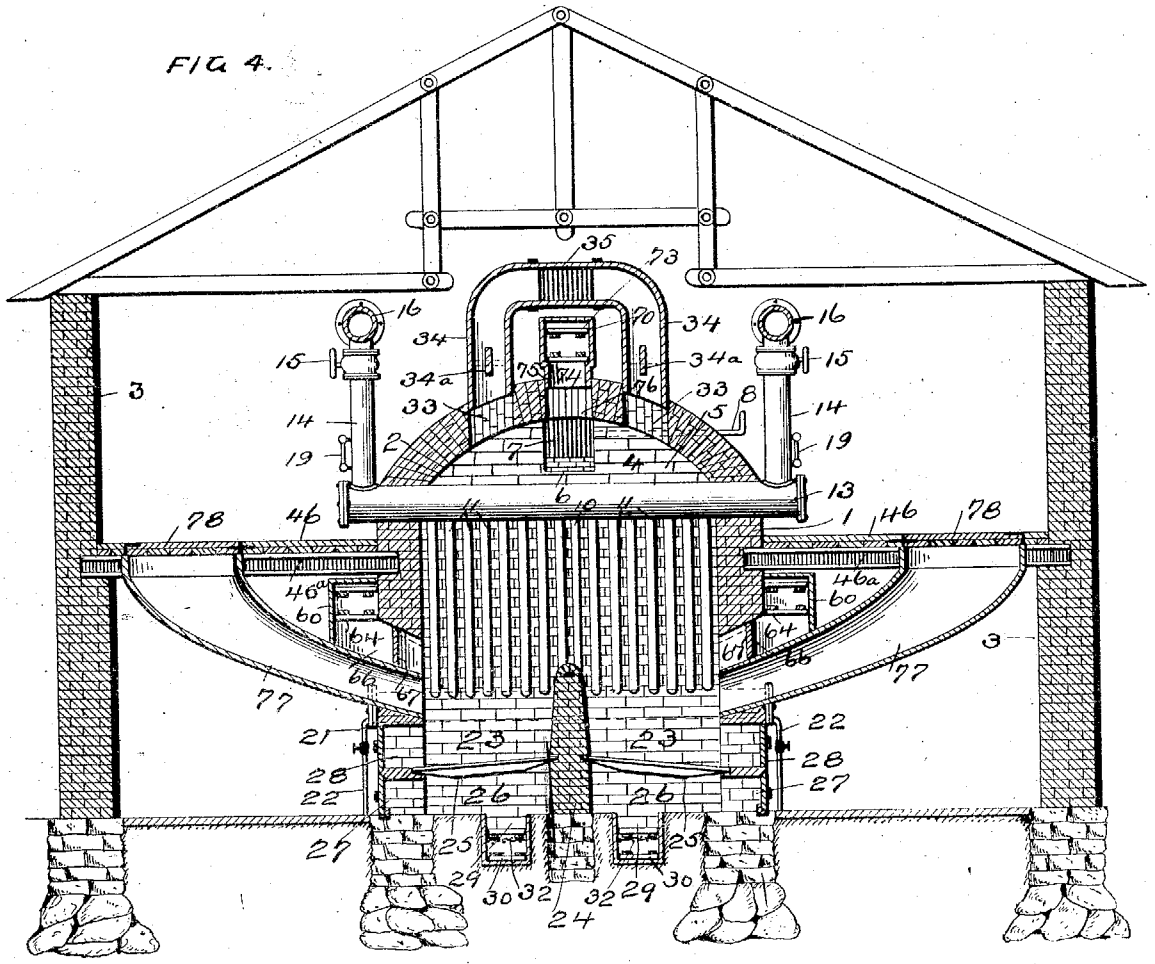
Figure 5:
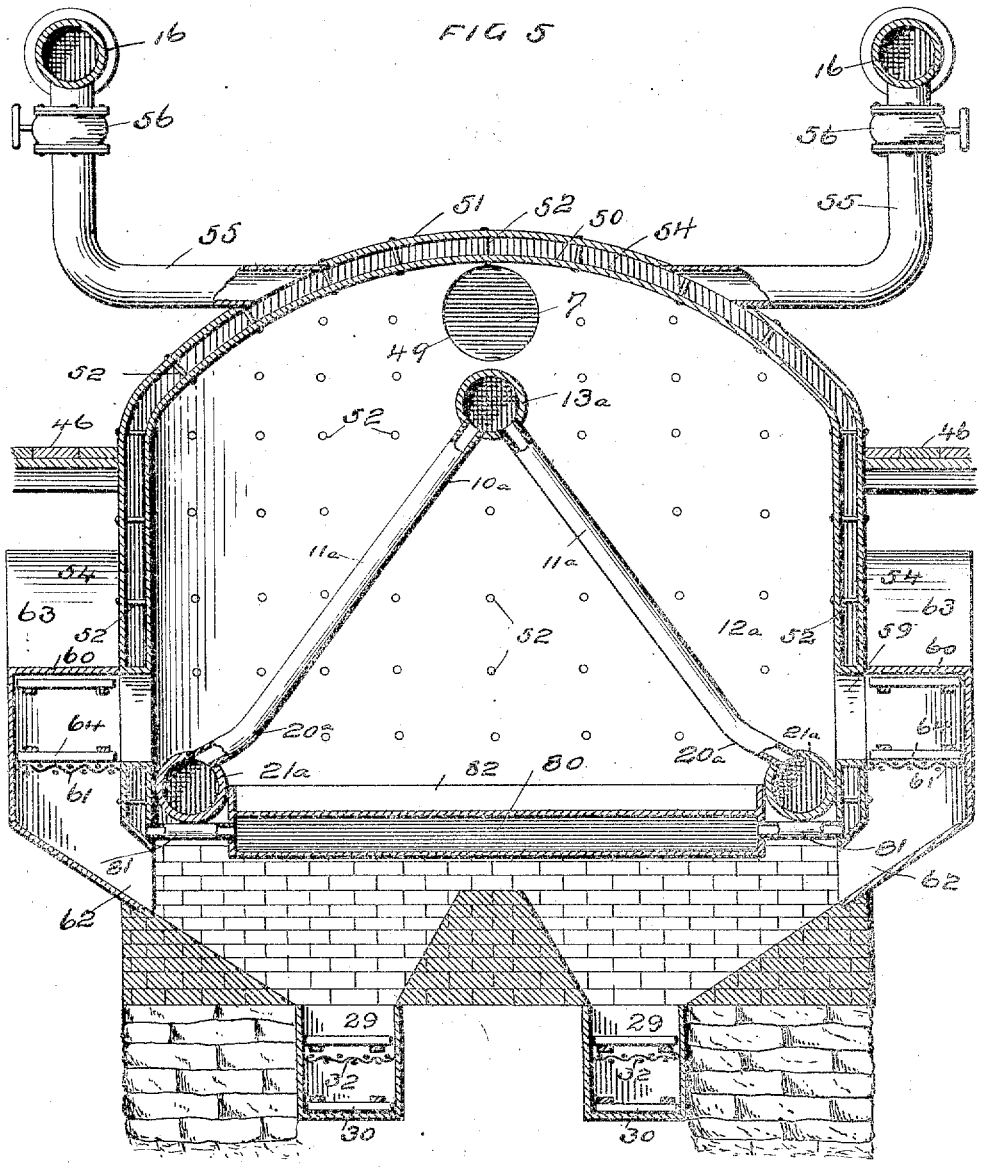

Referring to the drawings, Figure 1 is a side elevation of a complete garbage or refuse crematory constructed in accordance with this invention. Fig. 2 is a central vertical longitudinal sectional view of the entire crematory or apparatus. Fig. 3 is an enlarged vertical sectional view of one of the cremating-chambers of the crematory. Fig. 4 is a vertical transverse sectional view on the line 4 4 of Fig. 2, showing the crematory building inclosing the crematory. Fig. 5 is a similar view on the line 5 5 of Fig. 2. Fig. 6 is a side elevation of a modified form of incinerator or crematory embodying the principal features of the invention. Fig. 7 is a vertical longitudinal sectional view of the construction illustrated in Fig. 8. Fig. 8 is a vertical transverse sectional view on the line 8 8 of Fig. 7. Fig. 9 is a front view of the incinerator or crematory illustrated in Figs. 6, 7, and 8.

Referring to the accompanying drawings, the numeral 1 designates a furnace-casing, built in any suitable length according to the required capacity of the crematory, and said furnace-casing is preferably built of masonry and formed with an arched closed top portion 2. The furnace-casing 1 is designed to be arranged within a crematory building 3 and is built upon a suitable foundation below the floor-line of the building. In the present invention the said casing 1 is formed with a plurality of interior successively-arranged cremating chambers 4, separated from each other by vertical partition-walls 5, extending transversely across the interior space of the casing from top to bottom and from side to side thereof, as clearly illustrated in Fig. 4 of the drawings. The vertical partition-walls 5 are spaced at regular distances apart to form the successive series of cremating-chambers 4, and at their upper ends, next to the top of the furnace-casing, the vertical partitions 5 have formed therein flue-openings 6, which provide communication between the several chambers and are designed to be covered and uncovered by means of cut-off dampers 7, having operating levers or handles 8 extending beyond opposite sides of the casing, so as to provide means for opening and closing the dampers, as may be required.

Each of the cremating-chambers 4 has arranged therein, transversely from side to side thereof, a pair of spaced upwardly-convergent tubular or hollow garbage-supporting grates 10. The oppositely-located garbage-supporting grates 10 incline upwardly toward the transverse center of the cremating-chamber 4 and diverge from their upper adjacent ends to opposite lower sides of the cremating-chamber, and while for the purposes of this invention it is simply necessary to construct the grates 10 in a hollow or tubular form I have illustrated these grates as essentially comprising a plurality of parallel grate tubes or pipes 11, arranged sufficiently close together to form a support for ordinary garbage and refuse, while at the same time permitting the ascending flame and heat to pass therebetween and into the garbage supported thereby. The oppositely-arranged upwardly-convergent tubular garbage-supporting grates 10 form an inverted-V-shaped support for garbage, and the particular disposition of said grates provides for forming between the same and the adjacent walls of the cremating-chamber in which they are arranged the garbage cells or baskets 12, into which the garbage to be incinerated is dumped.

The parallel grate tubes or pipes 11, comprising the oppositely-disposed upwardly-convergent garbage-supporting grates in each of the cremating-chambers 4, are fitted at their upper ends in the lower sides of an upper centrally-arranged distributing header-drum 13, extending transversely across the cremating-chamber and projecting at its opposite ends through the opposite side walls of the furnace-casing, and the opposite ends of said upper distributing-header 13 have fitted thereto the lower ends of the oppositely-arranged steam-conducting pipes 14, provided with suitable valves 15, and connected at their upper ends with the steam-drum 16, arranged longitudinally above the furnace-casing, at opposite sides thereof, to provide for the pipe connections 14 with the projecting ends of distributing-headers 13 within each of the series of cremating-chambers 4, as clearly illustrated in Figs. 1 and 4 of the drawings. It will therefore be seen that the upper oppositely-arranged steam-drums 16 serve to collect and store the steam generated within the tubular garbage-supporting grates of each cremating-chamber, and by means of suitable pipe connections 17 steam may be conducted to an ordinary steam-engine 18 or utilized for other power purposes, as will be readily understood, the object of the pipe connections described being simply to utilize the heat within each cremating-chamber for generating steam and storing such steam for power purposes.

The pipe connections 14 between the transverse distributing-headers within each cremating-chamber may be provided with ordinary water-gages 19 for indicating the level of water therein, and the distributing-headers 13 are constructed in the form of cylindrical drums, which are of a sufficient size to hold the water circulated therein through the tubes or pipes 11 and also to provide a large heating area for such water. From their connection with the lower side of the upper distributing-header 13 the grate tubes or pipes 11 in each cremating-chamber diverge downwardly to opposite sides of the chamber and near their lower ends are angled, as at 20, to form a rest for supporting the body of the garbage, which has a constant tendency to slip downward within the cells 12 and to cave in as it becomes dried and is being consumed. The lower angled ends 20 of the grate tubes or pipes 11 within each cremating-chamber are connected with the water-distributing drums 21, arranged transversely within opposite sides of the cremating-chamber and having connected with their outer ends, exterior to such chamber, the water-pipes 22, which furnish a supply of water to the drums 21 in order that the pipes or tubes 11 may be kept filled with the same to prevent burning out and at the same time to provide for a continuous generation of steam for power purposes.

Within the bottom portion of each cremating-chamber 4, below the inverted-V-shaped garbage-support, the furnace-casing is formed with a pair of oppositely-located fire-boxes 23, arranged, respectively, at opposite sides of a centrally-disposed fire-wall 24, built on the floor of the casing and extending well up into the space between the oppositely-located grates 10 in order to insure the deflection of the flame and products of combustion upward through the grates 10. At opposite sides of the central fire-wall 24 are arranged the oppositely-located fire-grates 25, below which grates are formed the ash-pits 26, with which communicate the door-inclosed ash-pit openings 27, formed at opposite lower sides of the furnace-casing, and said casing is also provided with ordinary fire-doors 28 at opposite sides, which cover openings communicating with the fire-boxes 23 over the grates 25, whereby ready access may be had to the fires on the grates 25 for stoking or otherwise attending to the same. In connection with the pair of fire-grates 25 within the bottom portion of each cremating-chamber the furnace-casing has formed in the bed thereof the open conveyer-pits 29, extending longitudinally the entire length of the crematory and communicating with the interior thereof at the bottom, so as to receive the ashes and clinkers as they fall or are raked from the fire-grates 25 for the cremating-chambers 4. Said open longitudinal conveyer-pits 29 have arranged therein endless conveyer-aprons 30, arranged to travel over the conveyer rollers or wheels 31, mounted in suitable bearings at opposite extremities of the crematory or incinerator, and fitted within each of the open conveyer-pits 29, under the upper portion of the conveyer-aprons 30, is a separating-sieve 32, which serves to hold thereon clinkers and ashes, while the finer portions of the ashes are allowed to sift through into the bottom of the pit, so as to be conveyed in one direction by the lower portion of the apron 30, while the clinkers and ashes on top of the sieve are conveyed in an opposite direction by the upper portion of the apron. This separation of the clinkers and ashes is made important, as the materials thus separated can be used for making road-beds, it being understood that the material in question is often utilized for this purpose.

While the several cremating-chambers 4, equipped with garbage-supporting and fire-grates relatively disposed and arranged in the manner described, communicate with each other through the damper-controlled flue-openings 6, each of said cremating-chambers 4 has formed in the top thereof separate oppositely-located flue-openings 33, in which are fitted the lower ends of the oppositely-arranged branch flues or pipes 34, having elbow connections at their upper ends with opposite sides of a common escape flue or pipe 35, arranged longitudinally above the furnace-casing to provide for the branch-flue connections 34 therewith from each cremating-chamber and fitted at one end in the top of the furnace-casing, as at 36, so as to communicate with the upper end of the vertical end draft-flue 37. The flue 37 is formed vertically within one end of the casing 1 and communicates with the last cremating-chamber 4 of the series of such chambers formed within the casing, and said vertical end flue 37 extends to the floor of the crematory to form within its lower end a dust-pit 38, and directly above such dust-pit the draft-flue 37 opens into an escape-passage 39, communicating with a scent-consuming furnace 40, built at one end of the main casing 1 and provided therein with a fire-grate 41, on which is maintained a fire to provide for consuming the odors or scents that may be carried with the hot gases through the furnace 40. The said furnace 40 at the side opposite its communication with the escape-passage 39 opens into the lower end of the stack 42, which is sufficiently high to provide for maintaining a proper draft within the furnace-casing.

Under ordinary conditions when all of the cremating-chambers 4 are in operation the dampers 34ᵃ in the pipes 34 are closed, so as to compel the heat and other products of combustion to pass from one cremating-chamber to another through the flue-opening 6, and by reason of this circulation of the hot gases and other products of combustion the gases of one cremating-chamber are consumed in the next succeeding chamber, so that when the cremating-chambers are thus operated in series very little, if any, odor passes out of the end draft-flue 37 into the scent-consuming furnace 40, although it will be understood that whatever scent or odor may be carried out of the last cremating-chamber of the series will be consumed by the fire within the scent-consuming furnace. At times it may be necessary to cut off one of the cremating-chambers from the adjacent chambers, and this is accomplished by closing the proper dampers 7. When one or more of the cremating-chambers are thus cut off from direct communication with each other, the heat and other products of combustion, including the odoriferous gases, are allowed to escape from the other chambers into the common escape flue or pipe 35, which conducts the same to the end flue 37 and thence through the furnace 40 into the stack 42.

The furnace-casing 1 is provided in opposite sides thereof with a plurality of door-inclosed cell-openings 43, communicating with the garbage cells or baskets 12 to permit of access to such cells or baskets for the purpose of removing incombustible matter and also to permit of the stoking of the garbage within the cells or baskets whenever necessary. Above the plane of the door-inclosed cell-openings 43 the furnace-casing is further provided in opposite sides thereof with the door-inclosed feed-openings 44, communicating with the interior of the cremating-chambers 4 and the garbage cells or baskets 12, formed therein to permit of garbage being dumped into such cells or baskets for incineration, and at this point it is to be observed that the series of feed-openings 44 for the crematory at opposite sides of the furnace-casing are arranged above the plane of the roadways or dump-floors 46, built on the supporting-girders 46ᵃ within the crematory building 3 at opposite sides of the furnace-casing, said girders 46ᵃ being set into the side walls of the furnace-casing and the side walls of the building in which the casing is arranged, as clearly illustrated in Fig. 4 of the drawings. The said roadways or dump-floors 46 are arranged longitudinally along opposite sides of the furnace-casing and are extended at their ends into the inclined approaches 47, which lead from the road or street into the ends of the crematory building, so that the garbage carts or wagons can be driven directly onto the roadways or floors 46 and the contents thereof dumped into the cells or baskets of the cremating-chambers through the feed-openings 44, as will be readily understood.

The roadways or dump-floors 46 at opposite sides of the furnace-casing 1 are also extended along opposite sides of the auxiliary heater-casing 48, built at one end of the main furnace-casing 1 next to the first cremating-chamber 4 of the series of such chambers in said casing. The auxiliary heater-casing 48 communicates with the adjacent cremating-chamber 4 of the furnace-casing through a flue-opening 49, formed in the adjacent wall of the casing 1, said flue-opening of the casing 1 being preferably controlled by a damper and permitting the odoriferous and other hot gases to pass from the interior of the casing 48 into the first cremating-chamber of the series of the furnace. The said auxiliary heater-casing 48 essentially comprises inner and outer metallic shells 50 and 51, connected by intermediate fastening-stays 52, so as to confine therebetween a steam-jacket or steam-space 54, with which steam jacket or space 54 communicates one end of the steam-conducting pipes 55, provided with suitable cut-off valves 56 and connected at their upper ends with one end of the steam-drum 16 to provide means for constantly circulating the highly-heated steam throughout the hollow shell of the casing 48, so that the radiated heat of such casing will assist in drying the garbage or refuse that is introduced into opposite sides thereof through the feeding-openings 57, formed in opposite sides of the casing 48 above the plane of the roadways or dump-floors 46 and covered by the swinging doors 58.

Arranged longitudinally within the auxiliary heater-casing 48 and extending from end to end thereof is a pair of spaced unwardly-convergent tubular or hollow garbage-supporting grates $10^a$, similar in construction to the corresponding grates 10 in the cremating-chambers of the furnace proper, and while the garbage-supporting grates $10^a$ in the auxiliary heater-casing may be constructed in any hollow or tubular form still the said grates preferably comprise a pair of parallel grate tubes or pipes $11^a$, arranged sufficiently close together to form a support for ordinary garbage or refuse suitable for fuel, while at the same time permitting ashes and the like to sift through into the bottom of the casing 48, where it is collected within the pits 29 and distributed to the ends of the crematory by means of the conveyer-aprons 30 traveling in such pits.

The oppositely-arranged tubular garbage-supporting grates $10^a$ are upwardly-convergent in a similar manner to the grates 10 of the cremating-chambers and form an inverted-V-shaped support for the garbage, while the lower ends of said tubes or pipes $11^a$, comprising the grates $10^a$, are angled, as at $20^a$, to form a rest for supporting the body of the garbage within the garbage cells or baskets $12^a$, formed between the side walls of the casing 48 and the oppositely-located grates $10^a$. The upper ends of the grate tubes or pipes $11^a$, which converge toward the longitudinal center of the casing 48, are fitted to the under side of a central longitudinally-arranged upper header-drum $13^a$, connected at its opposite ends with the ends of the casing 48 and communicating with the steam jacket or space thereof, so as to receive the supply of live steam and distribute the same throughout the plurality of tubes or pipes comprising the opposite upwardly-inclined garbage-supporting grates. The lower angled ends of said tubes or pipes $11^a$ are fitted to the opposite lower circulating-drums $21^a$, fitted within the opposite lower sides of the casing 48 and extending longitudinally thereof, so as to communicate at their ends with the steam jacket or space of the casing 48 at the ends of the latter, and thereby completing a circulation for the steam, whereby the drums $13^a$ and $21^a$ and the tubes or pipes $11^a$ will be constantly filled with steam to insure a thorough drying of the garbage introduced into the casing 48.

The casing 48 is provided in opposite lower sides thereof with a plurality of discharge-openings 59, communicating with the adjacent open sides of the conveyer-boxes 60, arranged longitudinally of the entire crematory at opposite sides thereof. The portions of the conveyer-boxes 60 extending along opposite lower sides of the auxiliary heater-casings 48 are preferably provided with screen-bottoms 61, below which are formed short deflecting chutes 62, extending through the side walls of the auxiliary heater-casing below the plane of the openings 59, so as to discharge the material screened through the bottom 61 back into the bottom of the auxiliary heater-casing, so as to be collected within the pits 29, as will be hereinafter more particularly referred to.

At one end of the heater-casing 48 the opposite longitudinal conveyer-boxes 60 are provided with short upwardly-inclined portions 63, which prevent the elevation of liquid matter into the horizontal portions of the boxes extending along opposite sides of the casing 1, and arranged to travel within the boxes 60 throughout the entire length thereof are the endless conveyer-aprons 64, the upper portions of which aprons are supported for travel on the supporting-rollers 65, mounted within the boxes 60, while the lower portions of the said aprons 64 travel on the bottom of the boxes 60 and drag the garbage along therein to the feeding-hoppers 66, connected with the bottoms of the boxes 60 and extended laterally into the side walls of the furnace-casing over the fire-grates 25 therein, so as to deliver or feed dried garbage to such grates as fuel. The hoppers 66 communicate at their upper ends with the interior of the boxes 60, so that the dried garbage will fall thereinto as it is dragged along within the boxes by the conveyer-aprons, and said hoppers 66 are provided with suitable cut-off plates or valves 67, controlled by operating-levers 68, arranged exterior to the furnace-casing.

Each conveyer-box 60 extends beyond one end of the furnace-casing 1 and opens at such end into the lower end of an upwardly-extending inclined elevator-spout 69. The elevator-spouts 69 for the oppositely-located conveyer-boxes 60 are convergently arranged at one end of the furnace-casing and communicate at their upper ends with the interior of a distributing-box 70, arranged longitudinally above the furnace-casing 1 and parallel with and below the common escape flue or pipe 35. The elevator-spouts 69 accommodate for movement therein endless elevating belts or aprons 71, which serve to elevate the garbage delivered into the lower ends of the spouts 69 through such spouts and to discharge the same into one end of the distributing-box 70. This box 70 extends the entire length of the casing 1 and accommodates for movement therein an endless distributing apron or belt 73, the lower portion of which distributing apron or belt drags the garbage along on the bottom of the box 70. The said box 70 is provided at intervals with bottom discharge-openings 74, having short chute connections 75 with the top feed-openings 76, formed in the top of the casing at the central top portion of each cremating-chamber 4 to provide for delivering the garbage from the box 70 into such chambers. The top feed-openings 76 are disposed directly above the upper distributing header-drums 13, to which the grate tubes or pipes 11 are connected, so that as the garbage falls through the openings 76 it is deflected by said drums 13 into the oppositely-located garbage cells or baskets 12, thereby insuring an even distribution of the garbage within opposite portions of the cremating-chambers when it is delivered thereinto through the top feed-openings 76.

The garbage which is dried in the auxiliary heater 48 is employed for fuel and distributed to the different cremating-chambers in the manner described; but certain garbage which is delivered to the crematory in the carts or wagons may be in such a condition as to be immediately available for use as fuel, and to provide for utilizing garbage in this condition inclined feed-chutes 77 are arranged in pairs, respectively, at opposite sides of the furnace-casing below the roadways or dump-floors 46. The said feed-chutes 77 are fitted at their upper ends to the roadways or floors 46 and are covered at their upper open ends by the trap-doors 78, which when opened allow the garbage to be dumped directly from the cart or wagon into the chutes 77, and the lower ends of said chutes are extended laterally through the opposite side walls of the casing, so as to discharge thereinto directly above the fire-grates 25 for each cremating-chamber, whereby garbage in a condition for use as fuel may be dumped directly onto the fire-grates for such purpose.

It may be desirable in preparing the garbage for fuel in the heater or drier 48 to provide for catching the liquid and swill as they run from the garbage through the spaces between the supporting-grates $10^a$ within the casing 48, and to secure this result a hollow evaporating-pan 80 may be employed, as illustrated in Fig. 5 of the drawings. This hollow evaporating-pan 80 is of a width nearly equaling that of the casing 48 to provide for catching the liquid matter passing through the grates $10^a$, and at its opposite side edges the hollow pan 80 has pipe connections 81 with the opposite side portions of the steam jacket or space 54 of the casing 48, said pipe connections 81 allowing for contraction and expansion and at the same time providing means for heating the pan 80 by steam, so as to evaporate and dry the matter which may fall thereon. The said pan 80 is preferably formed with a peripheral upstanding flange 82 to confine the liquid matter thereon during the drying and evaporation thereof. Of course with the pan 80 in place within the heater or drier casing 48 the principal separation is intended to be accomplished through the screen-bottoms 61 of the boxes 60, and the separation will be more effective at these points because the garbage as it falls into the boxes 60 is in more or less of a dried condition, and the ashes and other matter which sift through the screen-bottoms 61 will be readily deflected into the pits 29 and distributed by means of the aprons 30. While the hollow evaporating-pan 80 has been described and illustrated in connection with the garbage-supporting grates of the heater or drier, it will of course be understood that the said pan may be advantageously employed below and in connection with the garbage-supporting grates of the cremating-chambers.

In operating the crematory it is of course understood that fires are primarily kindled on the fire-grates 25 within the bottom portion of each cremating-chamber, and the garbage is dumped through the feed-openings 44 at opposite sides of the furnace-casing onto the supporting-grates 10 within the cells or baskets 12, inclosed thereby. The heat and flame from the fires on the grates 25 will ascend between the oppositely-located supporting-grates 10 in each cremating-chamber and will work its way between the grate-tubes near their connection with the upper distributing header-drum 13. As the ascending flame from fires on the grates 25 consumes and reduces the garbage the same slips downward on the inclined grates 10, and thereby continually feeds itself toward the bottom of the cells or baskets 12, so as to be subjected to the direct action of the consuming fires, and in this way the garbage within the garbage-cells automatically feeds itself downward to leave room for fresh supplies of garbage. When all of the cremating-chambers are in direct communication, the odoriferous gases and other products of combustion pass to the end flue 37 and through the fire of the furnace 40 to the stack 42, the scents or odors of the gases and escaping products of combustion being consumed within the furnace 40, so that offensive odors will not escape from the stack; but should it be necessary to cut off communication between any of the cremating-chambers the draft may be deflected through the common escape flue or pipe 35 in the manner already described.

Certain portions of the garbage are introduced through the openings 57 of the heater or drier casing 48, and the garbage which falls onto the grates $10^a$ is dried by the steam circulating through such grates in the manner described and automatically falls in a more or less dried state into the conveyer-boxes 60, where a separation of certain portions of the garbage occurs in the manner previously referred to. The dried garbage is caught up within the boxes 60 by the endless conveyer-apron 64 and carried along to the feeding-hoppers 66, from which it may be discharged as required onto the fire-grates 25 and consumed as fuel, this operation being continued repeatedly, so that while the crematory is in operation dried garbage will form the fuel for the consuming fires, and, as previously referred to, garbage which is delivered in a condition suitable for fuel may be dumped directly onto the fire-grates through the chutes 77. The garbage which is not discharged through the hoppers 66 is conducted to the spouts 69, through which it is elevated by the belts or aprons 71 into the distributing-box 70 and is carried along in said box 70 by the distributing apron or belt 73 to the discharge-openings 74, from which openings it is delivered into the cremating-chambers in the manner previously described.

The principle of construction upon which the crematory is built is shown embodied in a smaller crematory or incinerator in Figs. 6 to 9, inclusive. This construction of crematory or incinerator is adapted for hospital and similar use, and the numeral 85 designates the casing, comprising inner and outer metallic shells 86 and 87, connected by intermediate fastening-stays 88, so as to confine therebetween a water jacket or space 89. The metallic water-jacket casing 85 has formed therein upright hollow partition-walls 90 and 91, respectively, communicating with the water-space of the jacket and having formed therein at the top of the casing the draft-opening 92, which provides communication between the interior portions of the casing and the end draft-flue 94, formed between the partition-wall 90 and one end of the casing 85. Said end flue communicates at its lower end at 95 with the lower end of the stack 96, arranged exterior to the casing and also communicating with the upper part of the casing through the damper-controlled draft-opening 97, piercing the rear end wall of the casing. The vertical end flue 94 has mounted within its lower end a fire-grate 98, designed to support a fire for consuming the odoriferous gases as they pass downward through the flue 94 into the stack 96, the space above and below the fire-grate 98 being accessible through the door-inclosed openings 99, formed in opposite sides of the casing 85.

The upright hollow partition-wall 91 is arranged intermediate of the front and rear ends of the casing 85 and is joined at its lower edge with a hollow floor 100, communicating with the water-jacket of the casing and provided therein with an opening 101, covered and uncovered by a sliding gate 102, controlled by an operating-rod 103, extending to the front of the casing 85. The wall 91 and the floor 100 inclose within the upper front portion of the casing 81 a drying-chamber 104, which is designed to hold garbage while the same is being dried for fuel, and after being dried, so as to be available for this use, the same is dropped through the opening 101 onto the horizontal fire-grate 105, arranged within the lower portion of the casing 85 and extending the entire length thereof.

Between the partition-walls 90 and 91 is arranged a pair of upwardly-convergent tubular or hollow garbage-supporting grates 106, provided with lower angled ends 107, fitted to opposite sides of the casing 85, so as to communicate with the water-jacket thereof. The opposite upwardly convergent or inclined garbage-supporting grates 106 preferably comprise a plurality of parallel grate tubes or pipes 108, fitted at their upper ends to the lower side of a cylindrical header-drum 109, connected at its ends respectively with the opposite walls 90 and 91 and communicating with the interior of such walls, so that there will be a constant circulation of water through the tubes or pipes 108. The supporting-grates 106 form downwardly-tapering garbage-cells 110 within opposite side portions of the casing 85, and in connection with these grates 106 the same operation is involved as in the cremating-chambers 4 of the construction hereinbefore described.

The heat generated within the casing 85 serves to generate steam within the water-jacket, which steam may be collected in a suitable steam-dome 111 and utilized for power purposes, and at this point it is to be observed that the casing 85 is provided at opposite sides with door-inclosed openings 112 and 113, respectively, to permit of feeding garbage respectively to the cells 110 in the drying-chamber 104.

Other changes in the form, proportion, and the minor details of construction may be resorted to without departing from the principle or sacrificing any of the advantages of this invention.

Having thus described the invention, what is claimed, and desired to be secured by Letters Patent, is—

1. A garbage-crematory comprising, in combination, a cremating-chamber, a fire-grate arranged within the lower portion of said chamber, a depending garbage-holding basket or cell arranged within said cremating-chamber, and above said fire-grate, and formed of a series of depending fixed tubes or pipes, an exit flue or opening provided in said crematory-chamber above the garbage-holding basket whereby the products of combustion from the fire-grate are compelled to pass between the tubes or pipes forming the garbage-holding basket, and means for circulating water through said tubes or pipes, substantially as described.

2. A garbage-crematory comprising, in combination, a cremating-chamber, a fire-grate arranged within the lower portion of said chamber, a depending garbage-holding basket or cell located within said cremating-chamber and above said fire-grate, and formed of a series of depending fixed tubes or pipes, an exit flue or opening provided in said cremating-chamber above said garbage-holding basket whereby the products of combustion from said fire-grate are compelled to pass between the tubes or pipes forming said garbage-holding basket, a water-space provided within the walls of said cremating-chamber, and means connecting said tubes or pipes with said water-space and thereby securing a circulation of water through said tubes or pipes, substantially as described.

3. A garbage-crematory comprising, in combination, a cremating-chamber, a fire-grate arranged within the lower portion of said chamber, a depending garbage-holding basket or cell located within said cremating-chamber, and above said fire-grate, and formed of a series of depending fixed tubes or pipes, means for circulating water through said tubes or pipes, and an exit-flue connected with said cremating-chamber above said garbage-holding basket or cell whereby the products of combustion from said fire-grate are compelled to pass between the tubes or pipes forming said garbage-holding basket, substantially as described.

4. A garbage-crematory comprising, in combination, a cremating-chamber, a fire-grate arranged within the lower portion of said chamber, a depending garbage-holding basket or cell located within said cremating-chamber and above said fire-grate, and formed of a series of depending fixed tubes or pipes, a water-space provided within the walls of said cremating-chamber, means connecting said tubes or pipes with said water-space and thereby securing a circulation of water through said tubes or pipes, and an exit-flue connected with said cremating-chamber above said garbage-holding basket or cell, whereby the products of combustion from said fire-grate are compelled to pass between the tubes or pipes forming said garbage-holding basket, substantially as described.

5. A garbage-crematory having a cremating-chamber, a fire-grate arranged within the lower portion of the chamber, oppositely-arranged upwardly-convergent tubular garbage-grates fixedly supported above the fire-grate and each comprising a plurality of tubes or pipes, said grates forming garbage-cells within the opposite portions of the cremating-chamber next to the side walls thereof, feed-openings communicating with said garbage-cells, and water-circulating connections with said tubes or pipes, substantially as described.

6. A garbage-crematory having a cremating-chamber, a fire-grate arranged within the lower portion of the chamber, oppositely-arranged upwardly-convergent tubular garbage-grates fixedly supported above the fire-grate and each comprising a plurality of tubes or pipes, said grates forming garbage-cells within the opposite portions of the cremating-chamber next to the side walls thereof, feed-openings communicating with said garbage-cells, a water-space arranged within the walls of the cremating-chamber and water-circulating connections between said space and said tubes or pipes, substantially as described.

7. A garbage-crematory having a cremating-chamber, a fire-grate arranged within the lower portion of the chamber, oppositely-arranged upwardly-convergent tubular garbage-grates fixedly supported above the fire-grate and each comprising a plurality of parallel tubes or pipes, said grates forming garbage-cells within the opposite portions of the cremating-chamber next to the side walls thereof, door-inclosed feed-openings formed in the sides of the cremating-chamber and communicating separately with the separate garbage-cells, and water-circulating connections with the ends of said grate tubes or pipes, substantially as set forth.

8. In a crematory, the casing, a pair of upwardly-convergent tubular garbage-supporting grates mounted within the casing and diverging from their upper adjacent ends downwardly toward opposite sides of the chamber in which they are arranged, said garbage-supporting grates comprising a plurality of parallel grate tubes or pipes having outturned lower angled ends, a header-drum fitted to the upper ends of the grate tubes or pipes of both garbage-supporting grates, circulating connections with the lower angled ends of said tubes or pipes, and a fire-grate arranged below the upwardly-convergent garbage-supporting grates, substantially as set forth.

9. In a crematory, the casing having a cremating-chamber, a pair of spaced upwardly-convergent tubular garbage-supporting grates mounted within the cremating-chamber and respectively extending upward from opposite sides of said chamber, an upper header-drum fitted to the upper ends of the tubular grates and extending transversely across the cremating-chamber, and projecting at its opposite ends through the side walls of the casing, steam-pipe connections with said projecting ends of the header-drum, oppositely-located drums arranged at opposite sides of the cremating-chamber and connected respectively with the lower ends of the opposite tubular grates, water-pipe connections with said oppositely-located drum, and a fire-grate arranged within the lower part of the cremating-chamber below the garbage-supporting grates, substantially as set forth.

10. In a crematory, the furnace-casing having a plurality of interior successively-arranged communicating cremating-chambers, a pair of spaced upwardly-convergent tubular garbage-supporting grates mounted within each cremating-chamber, an upper distributing header-drum fitted to the upper ends of each pair of grates and extending transversely across the cremating-chamber and projecting at its opposite ends through the side walls of the casing, water-pipe connections with the lower ends of each pair of grates, upper opposite exteriorly-arranged steam-drums, pipe connections between the exterior projecting ends of the header-drums and said steam-drums, and a pair of separated fire-grates fitted within the lower portion of each cremating-chamber, substantially as set forth.

11. In a crematory, the furnace-casing having a series of interior vertical partition-walls forming a plurality of successively-arranged cremating-chambers, said partition-walls being provided at their upper ends with damper-controlled flue-openings, a stack connection with one end of the furnace and communicating with the last cremating-chamber of the series, a pair of spaced upwardly-convergent tubular garbage-supporting grates mounted within each cremating-chamber and inclosing garbage-cells within opposite portions thereof, suitable water-circulating connections with the ends of the garbage-supporting grates, and fire-grates fitted within the lower portion of each cremating-chamber, substantially as set forth.

12. In a crematory, the furnace-casing having a plurality of interior successively-arranged communicating cremating-chambers, and open conveyer-pits formed in the bed thereof and extending the entire length of the crematory so as to communicate with the interior of all of the chambers therein, separating-sieves fitted in said conveyer-pits, suitable conveyers working above and below said separating-sieves, fire-grates fitted within the lower portion of each cremating-chamber over the conveyer-pits, and garbage-grates fitted in the cremating-chambers above the fire-grates, substantially as set forth.

13. In a crematory, the casing, the fire-grate arranged within the casing, a main garbage-supporting grate extending across the space above the fire-grate, a chamber independent of the main garbage-grate for drying portions of garbage for fuel, and means for delivering the portions of dried garbage from the drying-chamber onto the fire-grate below the plane of the main garbage-grate, substantially as set forth.

14. In a crematory, the main casing having a plurality of interior successively-arranged communicating cremating-chambers, main garbage-supporting grates fitted in the cremating-chambers, fire-grates arranged below said garbage-supporting grates, an auxiliary heater or drier casing, having a draft communication with the series of cremating-chambers of the main casing, oppositely-inclined garbage-supports arranged within said heater or drier casing, means for drying portions of garbage for fuel on said supports, and means for automatically conveying the dried garbage from the lower ends of said garbage-supports in the heater or drier casing onto the fire-grates below the planes of the main garbage-grates in the cremating-chambers, substantially as set forth.

15. In a crematory, the main casing having a plurality of interior successively-arranged cremating-chambers, garbage-supporting and fire grates fitted in each cremating-chamber, a metallic steam-jacketed auxiliary heater or drier casing communicating with the series of cremating-chambers, a pair of spaced upwardly-convergent tubular or hollow garbage-supporting grates arranged longitudinally within the heater or drier casing, a central longitudinally-arranged upper header-drum communicating with the steam-space at the ends of the heater or drier casing and fitted to the upper ends of said tubular supporting-grates, suitable connections between the lower ends of said grates and the steam jacket or space of the casing, and means for automatically delivering and conveying the dried garbage from the lower ends of the garbage-supporting grates in the heater or drier casing to the fire-grates in the cremating-chambers, substantially as set forth.

16. In a crematory, the main casing having a plurality of interior cremating-chambers, garbage-supporting and fire grates fitted in each cremating-chamber, a steam-jacketed heater or drier casing communicating with the cremating-chambers and provided in opposite lower sides with a plurality of discharge-openings, oppositely-inclined upright tubular garbage-supporting grates arranged within the steam-jacketed casing and communicating with the steam-space thereof, the lower ends of the oppositely-arranged tubular grates extending to opposite sides of the casing below said discharge-openings so as to deflect dried garbage therethrough, conveyer-boxes arranged at opposite sides of the main and auxiliary casings exterior thereto, said conveyer-boxes communicating with said discharge-openings and having hoppers extended into the cremating-chambers above the fire-grates, and suitable garbage-conveyers arranged to work in said conveyer-boxes, substantially as set forth.

17. In a crematory, the main casing having a plurality of interior cremating-chambers, garbage-supporting and fire grates fitted in each cremating-chamber, a steam-jacketed auxiliary heater or drier casing communicating with the cremating-chambers and provided in opposite lower sides with a plurality of discharge-openings, a pair of opposite oppositely-inclined upright tubular garbage-supporting grates arranged within the steam-jacketed casing and extending to the sides thereof below the discharge-openings, conveyer-boxes arranged longitudinally of the sides of the main and auxiliary casings exterior thereto, said conveyer-boxes communicating with said discharge-openings, and provided with screen-bottoms in the portions thereof next to the auxiliary casing, deflecting-chutes extended from the screen-bottom portions of the conveyer-boxes into the auxiliary casing below the grates therein, hopper connections extended from the conveyer-boxes into the cremating-chambers over the fire-grates, and suitable conveyers arranged in said conveyer-boxes, substantially as set forth.

18. In a crematory, the main casing having a plurality of interior cremating-chambers, garbage-supporting and fire grates fitted in each cremating-chamber, an auxiliary heater or drier casing communicating with the series of cremating-chambers, a pair of spaced upwardly-convergent tubular garbage-supporting grates arranged within the heater or drier casing, a hollow evaporating-pan supported below said tubular grates and having pipe connections with the jacket of said heater or drier casing, and suitable conveyers for delivering the dried garbage from the heater or drier casing to the fire-grates in the cremating-chambers, substantially as set forth.

19. In a crematory, the main casing having a plurality of interior cremating-chambers provided with top feed-openings, an auxiliary heater or drier casing having garbage-supporting grates therein and communicating with said cremating-chambers, said heater or drier casing also having opposite discharge-openings for dried garbage, opposite longitudinally-arranged conveyer-boxes communicating with said discharge-openings and provided at intervals with feeding-hoppers extended into the cremating-chambers over the fire-grates therein, garbage-conveyers working in said conveyer-boxes, a distributing-box arranged longitudinally above the main casing and having bottom chute connections with the top feed-openings of the cremating-chambers, a distributing apron or belt working in the distributing-box, and suitable elevators for delivering the garbage from one end of the conveyer-boxes to said distributing-box, substantially as set forth.

20. In a crematory, the furnace-casing having a series of interior vertical partition-walls provided at their upper ends with damper-controlled flue-openings and forming a plurality of communicating cremating-chambers having in the top thereof separate oppositely-located flue-openings, a stack connection with one end of the furnace, a common escape flue or pipe arranged longitudinally above the furnace-casing, and communicating at one end with said stack connection and branch flues or pipes fitted at one end in the flue-openings in the top of the cremating-chambers and connected at their other ends with said common escape flue or pipe, substantially as set forth.

21. In a crematory, the furnace-casing having a plurality of interior communicating cremating-chambers, garbage-supporting and fire grates arranged one above the other in said cremating-chambers, roadways or dump-floors arranged longitudinally of the casing at opposite sides thereof, and provided with trap-doors, and feed-chutes extending from said trap-doors through the sides of the cremating-chambers above the fire-grates therein and below the plane of the garbage-grates, substantially as set forth.

22. The combination, in a garbage-crematory, with a garbage-holding grate, of an evaporating-pan arranged below said grate and adapted to receive the liquid that drains from the garbage upon said grates, a steam-space provided within said pan and means for supplying steam to said steam-space, for heating said pan.

23. The combination, in a garbage-crematory, with means for drying the garbage, of an evaporating-pan, located below the garbage-drying means and provided with a steam-space and arranged to receive the liquid that drains from the garbage that is being dried, and means for supplying steam to said steam-space, substantially as described.

24. The combination, in a garbage-crematory, with a chamber formed of inner and outer walls provided with a water and steam space between them, of a fire-grate arranged in the lower part of said chamber, a garbage-holding grate formed of a series of depending fixed tubes or pipes located within said chamber above said fire-grate and connections between said tubes or pipes and the steam and water space between the inner and outer walls of said chamber, substantially as described.

25. The combination, in a garbage-crematory with a garbage-holding grate, and a chamber within which said grate is arranged the walls of said chamber being provided with a suitable steam-space, of an evaporating-pan arranged below said grate and adapted to receive liquid from the garbage, a steam-space provided within said pan, and connections between the steam-space in the walls of the chamber and the steam-space in said pan, substantially as described.

26. The combination, in a garbage-crematory, with a garbage-holding grate formed of a series of tubes or pipes, of a chamber within which said grate is located, the walls of said chamber being provided with a suitable steam-space, an evaporating-pan also arranged in said chamber below said grate and provided with a suitable steam-space, and connections between the steam-space in the walls of said chamber and the tubes or pipes forming said grates, and the steam-space in said evaporating-pan.

27. A garbage-crematory comprising, in combination, a cremating-chamber, a fire-grate arranged within the lower portion of said chamber, a depending garbage-holding basket or cell arranged within said cremating-chamber, and above said fire-grate, and formed of a series of depending fixed tubes or pipes, inclined feed-chutes opening through the wall of the chamber and arranged to deliver material upon said fire-grate and below said garbage-holding basket, and means for circulating water through said tubes or pipes, substantially as described.

28. The combination in a garbage-crematory, with a chamber having its walls formed of inner and outer metallic shells with a water and steam space between them of a fire-grate located in the lower part of said chamber, a depending garbage-holding basket or cell, arranged within said chamber above said fire-grate and formed of a series of inclined fixed tubes or pipes and connections between said tubes or pipes and the steam and water space between the inner and outer walls of said chamber, substantially as described.

In witness whereof I have hereunto set my hand this 13th day of August, 1902.

FELIX LOUIS DECARIE.

In presence of—
A. C. PAUL,
C. G. HANSON.